United States Patent
Woo et al.

(10) Patent No.: US 11,868,270 B2
(45) Date of Patent: Jan. 9, 2024

(54) STORAGE SYSTEM AND STORAGE DEVICE, AND OPERATING METHOD THEREOF

(71) Applicant: SAMSUNG ELECTRONICS CO., LTD., Suwon-si (KR)

(72) Inventors: Seung Moon Woo, Suwon-si (KR); Seon Bong Kim, Suwon-si (KR); Han-Ju Lee, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/820,631

(22) Filed: Aug. 18, 2022

(65) Prior Publication Data

US 2023/0214329 A1    Jul. 6, 2023

(30) Foreign Application Priority Data

Jan. 4, 2022    (KR) .................... 10-2022-0000822

(51) Int. Cl.
  *G06F 12/1045*    (2016.01)
  *G06F 12/0862*    (2016.01)
  *G06F 12/1081*    (2016.01)

(52) U.S. Cl.
  CPC ...... *G06F 12/1045* (2013.01); *G06F 12/0862* (2013.01); *G06F 12/1081* (2013.01)

(58) Field of Classification Search
  CPC ............ G06F 12/0246; G06F 12/0862; G06F 12/1027; G06F 12/1045; G06F 12/1081; G06F 2212/1016; G06F 2212/1024; G06F 2212/7201
  See application file for complete search history.

(56) References Cited

U.S. PATENT DOCUMENTS

| | | | |
|---|---|---|---|
| 8,161,243 B1 | 4/2012 | Wagh et al. | |
| 8,171,230 B2 | 5/2012 | Freimuth et al. | |
| 8,995,302 B1 | 3/2015 | Brown et al. | |
| 9,336,173 B1 | 5/2016 | Sodke et al. | |
| 10,210,131 B2 | 2/2019 | Craddock et al. | |
| 10,585,734 B2 | 3/2020 | Panian et al. | |
| 10,929,310 B2 | 2/2021 | Borikar et al. | |
| 2017/0212844 A1* | 7/2017 | Williams | .............. G06F 3/0611 |
| 2021/0149815 A1 | 5/2021 | Gayen et al. | |

\* cited by examiner

*Primary Examiner* — Aracelis Ruiz

(74) *Attorney, Agent, or Firm* — F. Chau & Associates, LLC

(57) ABSTRACT

A storage device includes a storage controller and a host interface which sends an address translation service request to a host. The host interface includes an address translation cache which stores first address information included in the address translation service request, and an address translation service latency storage which stores latency-related information including a first time until the address translation cache receives an address translation service response corresponding to the address translation service request from the host. After the host interface sends the address translation service request to the host based on the latency-related information including the first time, and after the first time elapses, the storage controller polls the host interface.

20 Claims, 12 Drawing Sheets

STORAGE SYSTEM AND STORAGE DEVICE, AND OPERATING METHOD THEREOF

CROSS-REFERENCE TO RELATED APPLICATION

This application claims priority under 35 U.S.C. § 119 to Korean Patent Application No. 10-2022-0000822, filed on Jan. 4, 2022 in the Korean Intellectual Property Office, the disclosure of which is incorporated by reference herein in its entirety.

TECHNICAL FIELD

Embodiments of the present invention relate to a storage system, a storage device, and an operating method thereof.

DISCUSSION OF RELATED ART

A storage system may provide address translation for direct memory access (DMA) from an I/O device (e.g., network adapters, a graphic process unit (GPU), a storage controller, etc.) to a main memory of the storage system. The storage system may include an I/O memory management unit (IOMMU) for protecting the memory from error operations due to a limited size of the main memory to which the I/O devices are accessible.

The storage system may include an I/O translation lookaside buffer (IOTLB) to increase the performance of the I/O memory management unit. The I/O translation lookaside buffer may be used as a cache for increasing an address checking speed. The storage system may further include a device-side I/O translation lookaside buffer (also referred to as a translation lookaside buffer (TLB) or an address translation cache (ATC)) on a device-side of the storage system (e.g., a host interface in the storage device) to reduce a cache miss of the I/O translation lookaside buffer. The I/O translation lookaside buffer (or the translation lookaside buffer (TLB) or the address translation cache (ATC)) may support address translation services (ATS) defined by a peripheral component inter-connect-special interest group (PCI-SIG®) and/or a peripheral component interconnect express (PCIe®).

SUMMARY

Embodiments of the present invention provide a storage device, a storage system and a method for mitigating performance degradation due to a cache miss that occurs in a storage system which supports an address translation services (ATS).

According to an embodiment of the present invention, a storage device includes a storage controller and a host interface which sends an address translation service request to a host. The host interface includes an address translation cache which stores first address information included in the address translation service request, and an address translation service latency storage which stores latency-related information including a first time until the address translation cache receives an address translation service response corresponding to the address translation service request from the host. After the host interface sends the address translation service request to the host based on the latency-related information including the first time, and after the first time elapses, the storage controller polls the host interface.

According to an embodiment of the present invention, a storage system includes a host, and a storage device including a host interface that sends an address translation service request to the host and a storage controller that polls the host interface. The host interface includes an address translation cache which stores first address information included in the address translation service request, and an address translation service latency storage which stores latency-related information including a latency time until the address translation cache receives an address translation service response corresponding to the address translation service request from the host. After the host interface sends the address translation service request to the host based on the latency-related information including the latency time, and after the latency time elapses, the storage controller polls the host interface.

According to an embodiment of the present invention, a method of operating a storage device includes sending an address translation service request to a host through a host interface, receiving an address translation service response from the host, by an address translation cache which stores first address information to be sent to the host, measuring a first time at which the address translation service response is sent to the address translation cache from the host, and recording the first time in an address translation service latency storage. After the host interface sends the address translation service request to the host based on the recorded first time, and after the first time elapses, a storage controller communicating with the host interface polls the host interface.

BRIEF DESCRIPTION OF THE DRAWINGS

The above and other aspects and features of the present disclosure will become more apparent by describing in detail embodiments thereof with reference to the accompanying drawings.

DETAILED DESCRIPTION OF THE EMBODIMENTS

Figure 1:
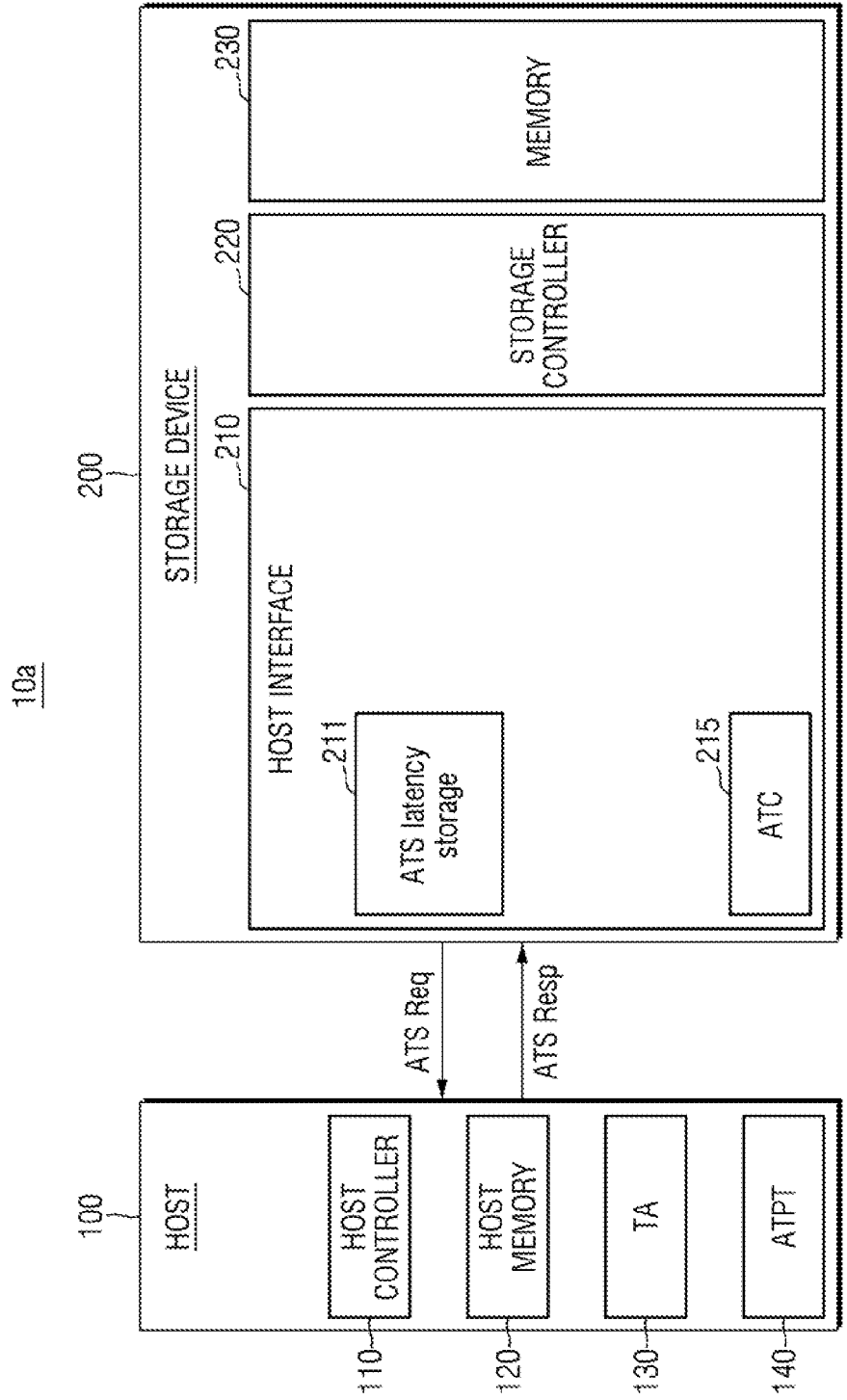
FIG. 1 is a block diagram which shows a storage system according to some embodiments.

Embodiments of the present inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

It will be understood that when a component is referred to as being "connected to", "coupled to", or "adjacent to" another component, it can be directly connected, coupled, or adjacent to the other component, or intervening components may be present. It will also be understood that when a component is referred to as being "between" two components, it can be the only component between the two components, or one or more intervening components may also be present. Other words used to describe the relationships between components should be interpreted in a like fashion.

FIG. 1 is a block diagram which shows a storage system according to some embodiments.

Referring to FIG. 1, a storage system 10a according to some embodiments may be, for example, a mobile system such as a mobile phone, a smartphone, a tablet PC (personal computer), a wearable device, a healthcare device or an Internet of Things (IoT) device. However, the storage system 10a of FIG. 1 is not necessarily limited to a mobile system. For example, according to embodiments, the storage system 10a may be a personal computer, a laptop computer, a server, a media player or an automotive device such as a navigation device, etc.

The storage system 10a according to some embodiments includes a host 100 and a storage device 200.

The host 100 includes a host controller 110, a host memory 120, a translation agent (TA) 130, and an address translation and protection table (ATPT).

According to an embodiment, the host controller 110 and the host memory 120 may be implemented as separate semiconductor chips. Alternatively, in some embodiments, the host controller 110 and the host memory 120 may be integrated on the same semiconductor chip. As an example, the host controller 110 may be one of a plurality of modules provided in the application processor, and the application processor may be implemented as a system-on-chip (SoC).

Further, the host memory 120 may be an embedded memory provided in the application processor, or may be a non-volatile memory or a memory module disposed outside of the application processor. The host memory 120 may function as a buffer memory for temporarily storing the data to be sent to the storage device 200 or the data sent from the storage device 200.

The translation agent 130 may include hardware, firmware, and/or software that translates an address in a PCIe transaction into a physical address associated therewith.

The address translation and protection table 140 may store address translation information processed from the translation agent 130 to handle PCIe requests such as a direct memory access (DMA) read or a direct memory access write among the address translation services (ATS).

The storage device 200 includes a host interface 210, a storage controller 220, and a non-volatile memory 230.

The storage device 200 may include a storage medium for storing data in response to a request from the host 100. The storage device 200 may be a solid state device (SSD), and may be, for example, a device that complies with a non-volatility memory express (NVMe) standard. The host 100 and the storage device 200 may each generate and send packets according to the adopted standard protocol.

When the non-volatile memory 230 of the storage device 200 includes a flash memory, such a flash memory may include a 2D NAND memory array or a 3D (or vertical) NAND (VNAND) memory array. As another example, the storage device 200 may include various different types of non-volatile memories. For example, the storage device 200 may include a Magnetic RAM (MRAM), a spin-transfer torque MRAM, a conductive bridging RAM (CBRAM), a Ferroelectric RAM (FeRAM), a Phase RAM (PRAM), a resistive memory (Resistive RAM), and various other types of memories.

The host controller 110 may manage the operation of storing the data (e.g., write data) of the buffer region of the host memory 120 in the non-volatile memory 230 or storing the data (e.g., read data) of the non-volatile memory 230 in the buffer region.

The host interface 210 may send and receive packets to and from the host 100. The packets sent from the host 100 to the host interface 210 may include a command or data to be written in the non-volatile memory 230, and the packets sent from the host interface 210 to the host 100 may include a response to the command, data read from the non-volatile memory 230, etc.

The storage controller 220 may control the data writing and reading operations on the non-volatile memory 230 by executing the flash translation layer through the central processing unit in the storage controller 220.

The host interface 210 may send an address translation service request (ATS Req) to the host 100. The address translation service request (ATS Req) may be a request for reading the data stored in the host memory 120 or a request for writing the data in the host memory 120.

The address translation service requests (ATS Req) may be related to one or more ATC entry replacement policies (e.g., a user definition, a QoS, a rate limit or workload-based policies). Alternatively, the address translation service request (ATS Req) may be related to an ATC entry replacement algorithm (e.g., DWRR: Deficit Weighted Round Robin).

The host 100 may send an address translation service response (ATS Resp) of the address translation service request (ATS Req) to the host interface 210. The address translation service response (ATS Resp) may be a completion response to the request of the host interface 210, or may be a cache miss response in which the address information requested by the host interface 210 does not exist.

Depending on the configuration environment of the storage system, the time for sending the address translation service response (ATS Resp) from the host 100 to the address translation cache 215 may differ. This will be described further with reference to FIGS. 2 and 3.

Figure 2:
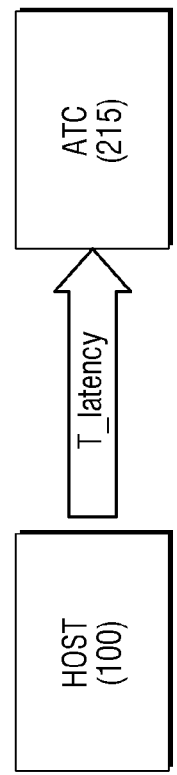
FIG. 2 is an exemplary diagram for explaining a latency time according to some embodiments.
Figure 3:
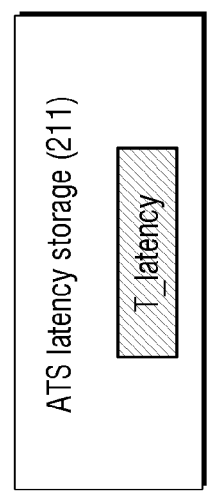
FIG. 3 is an exemplary diagram for explaining latency-related information stored in address translation cache latency storage according to some embodiments.

FIG. 2 is an exemplary diagram for explaining a latency time according to some embodiments. FIG. 3 is an exemplary diagram for explaining latency-related information stored in address translation cache latency storage according to some embodiments.

Referring to FIGS. 1 to 3, the time it takes for the address translation service response (ATS Resp) sent from the host 100 to reach the address translation cache 215 may be defined as a latency time (T_latency).

The latency time (T_latency) may change depending on the configuration environment of the storage system. Therefore, the storage system 10a according to some embodiments may include an address translation service latency storage 211, which is a storage space for recording and storing the latency time (T_latency) in the host interface 210.

The address translation service latency storage 211 may be configured by, for example, a register. However, embodiments of the present invention are not limited thereto. For example, in some embodiments, the address translation service latency storage 211 may be configured in another form as long as it may store the latency time (T_latency).

That is, the storage system 10a according to some embodiments stores the latency time (T_latency) according to the configuration of each storage system in the address translation service latency storage 211, and the storage system 10a may perform the operation, by referring to the latency time (T_latency).

For example, the host interface 210 sends the address translation service request (ATS Req) to the host 100, and then may perform an operation (e.g., communication with the storage controller 220) other than the address translation service request (ATS Req) during the latency time (T_latency), by referring to the latency time (T_latency) recorded in the address translation service latency storage 211.

That is, the host interface 210 that has sent the address translation service request (ATS Req) to the host 100 performs another operation during the latency time (T_latency), with no need to wait without performing other operations until the address translation service response (ATS Resp) is received from the host 100, and may receive the address translation service response (ATS Resp) from the host 100 in accordance with the latency time (T_latency). As a result, the operating efficiency of the host interface 210 can be increased according to some embodiments.

When measuring the time it takes for the address translation service response (ATS Resp) sent from the host 100 to reach the address translation cache 215, a plurality of latency times may be measured. That is, a plurality of latency times may be stored in the address translation service latency storage 211. In addition to the latency time, other latency-related information related to the latency time may be stored in the address translation service latency storage. The latency-related information may be, for example, the latency time according to the operating performance of the storage device 200 (e.g., the operating performance according to the size of the command by which the storage device 200 communicates with the host 100).

The storage system 10a may operate by referring to the latency-related information stored in the address translation service latency storage 211, for example, the latency time.

For example, after the storage controller 220 sends the address translation service request to the host 100 on the basis of the latency time recorded in the address translation service latency storage 211, and after the latency time elapses, a polling operation may be performed on the host interface 210.

At this time, the storage controller 220 may perform the polling operation on the basis of a minimum latency time among the plurality of latency times stored in the address translation service latency storage 211.

As another example, the storage controller 220 may perform the polling operation on the basis of an average latency time calculated by averaging a plurality of latency times stored in the address translation service latency storage 211.

Figure 4:
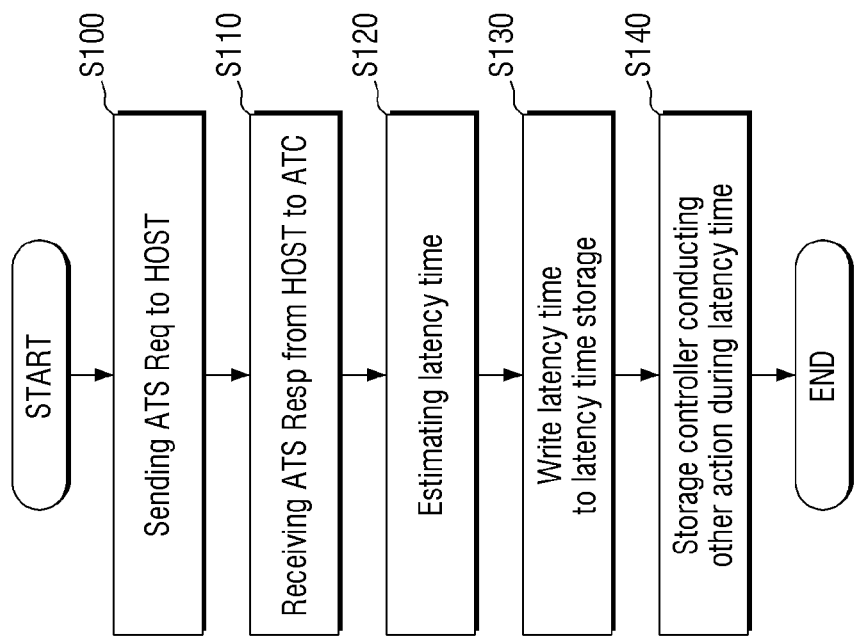
FIG. 4 is a flowchart which shows the operation of the storage device according to some embodiments.

FIG. 4 is a flowchart which shows the operation of the storage device according to some embodiments.

Referring to FIGS. 1 to 4, the host interface 210 sends the address translation service request (ATS Req) to the host 100 (S100).

After that, the address translation cache 215 receives the address translation service response (ATS Resp) from the host 100 (S110).

At this time, the latency time (T_latency) at which the address translation service response (ATS Resp) is sent from the host 100 to the address translation cache 215 is measured (S120).

Subsequently, the latency time (T_latency) is recorded in the address translation service latency storage 211 (S130). At this time, there may be a plurality of latency times (T_latency) stored in the address translation service latency storage 211.

Subsequently, the host interface 210 sends the address translation service request (ATS Req) to the host 100, and then may perform another operation that is not related to the address translation service request during the latency time (T_latency), by referring to the latency time (T_latency) stored in the address translation service latency storage 211 (S140).

That is, the storage controller 220 sends the address translation service request (ATS Req) to the host 100, and then may perform another operation other than the polling operation on the host interface 210 during the latency time (T_latency), without performing polling on the host interface 210, while receiving the address translation service response (ATS Resp) from the host 100. Subsequently, the storage controller 220 may perform the polling on the host interface 210 after the latency time (T_latency). The operating efficiency of the storage controller 220 or the storage device 200 including the storage controller 220 can be increased accordingly.

Hereinafter, for convenience of explanation, a further description of components and technical aspects previously described may be omitted.

Figure 5:
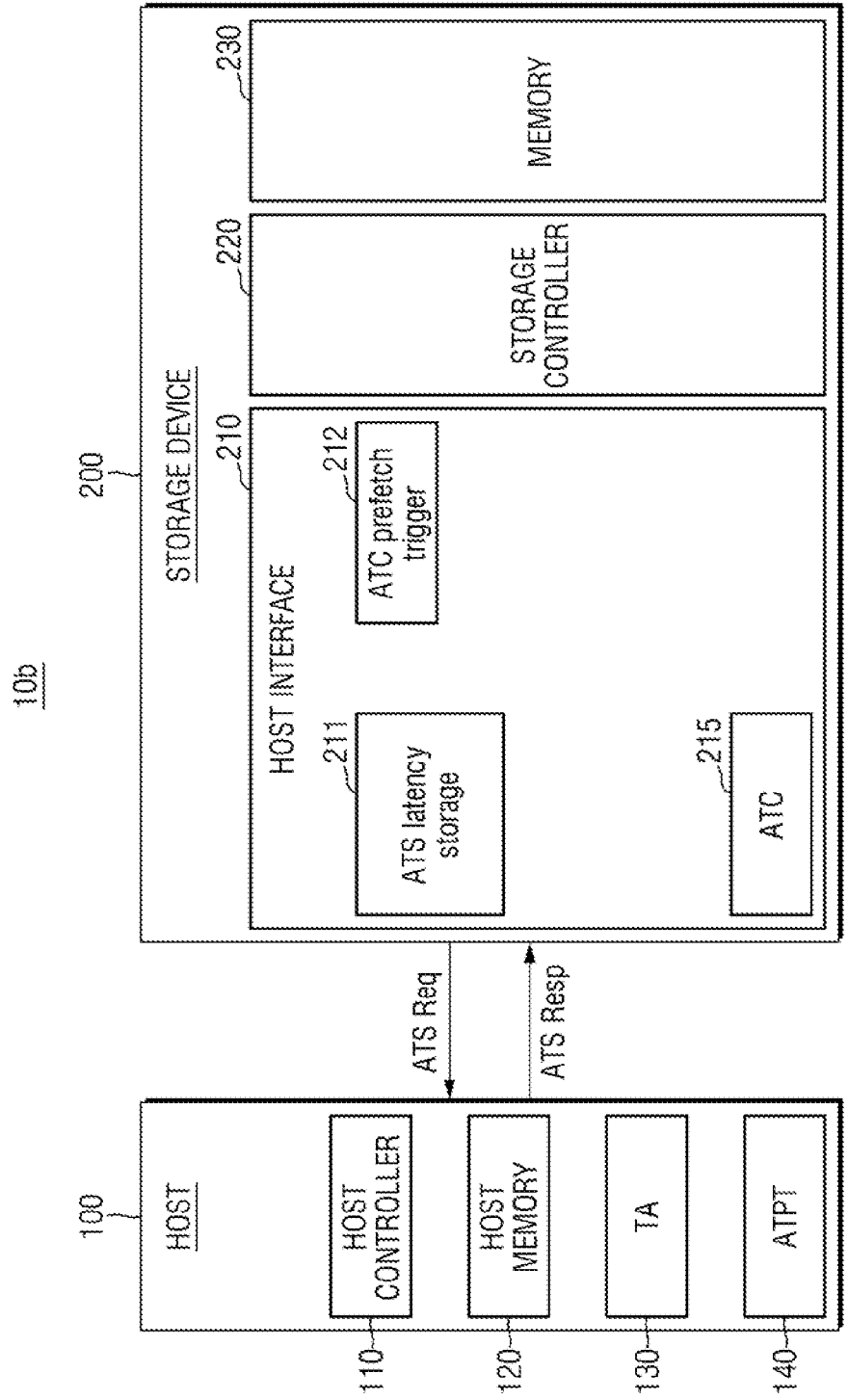
FIG. 5 is a block diagram which shows a storage system according to some embodiments.

FIG. 5 is a block diagram which shows a storage system according to some embodiments.

Referring to FIG. 5, a storage system 10b according to some embodiments may further include an address translation cache prefetch trigger 212 disposed inside the host interface 210, unlike the storage system 10a of FIG. 1.

The operation of the storage system 10b according to some embodiments including the address translation cache prefetch trigger 212 will be described together with reference to FIG. 6.

Figure 6:
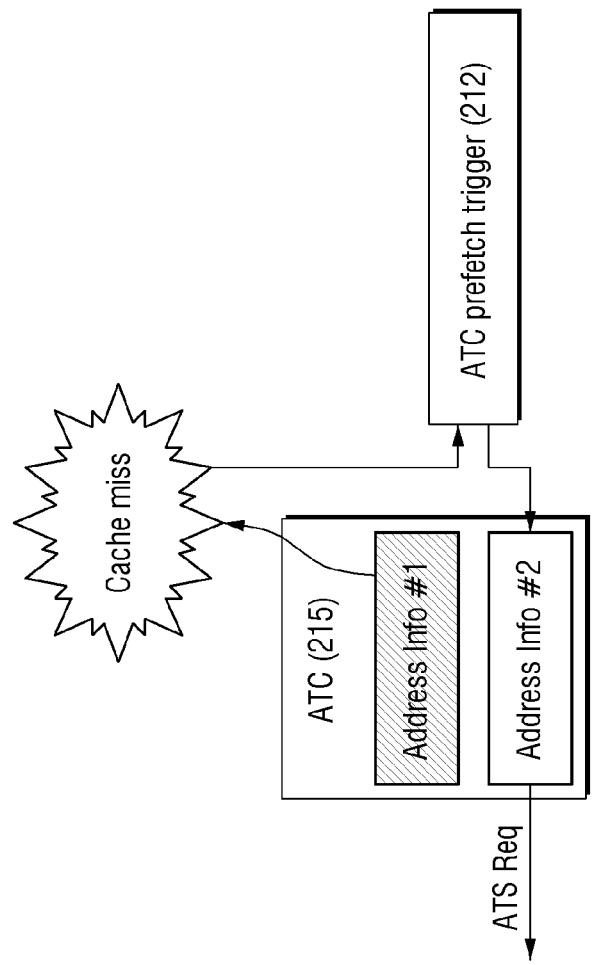
FIG. 6 is a block diagram for explaining the operation of the storage device according to some embodiments when a cache miss occurs.

FIG. 6 is a block diagram for explaining the operation of the storage device according to some embodiments when a cache miss occurs.

Referring to FIGS. 5 and 6, the address translation service request (ATS Req) sent by the host interface 210 to the host 100 is assumed to include first address information (Address Info #1) inside the address translation cache 215.

Hereinafter, the first address may mean, for example, a physical address corresponding to one region in the host memory 120. That is, the first address information (Address Info #1) may mean a virtual address corresponding to the first address.

The host 100 may include a storage space for storing mapping information of the physical addresses and the virtual addresses.

For example, when the host 100 receives the address translation service request from the host interface 210, the host 100 identifies a virtual address (e.g., first address information (Address Info #1)) included in the address translation service request, and may find a physical address mapped to the identified virtual address (e.g., the first address information (Address Info #1)).

The physical address mapped to the virtual address (e.g., the first address information (Address Info #1)) may be, for example, the first address.

The host 100 may send a physical address (e.g., the first address) mapped to the virtual address (e.g., the first address information (Address Info #1)) received from the host interface 210 to the host interface 210 through the address translation service response.

Subsequently, referring to FIGS. 5 and 6, if it is determined in the host 100 that the first address information (Address Info #1) does not exist in the host memory 120 in connection with the address translation service request (ATS Req) including the first address information (Address Info #1) received from the host interface 210, the host 100 sends a cache miss, which notifies that the first address information (Address Info #1) does not exist, to the host interface 210.

According to embodiments, the host interface 210 that has received the cache miss from the host 100 corrects the address information requested from the host 100. For example, the host interface 210 may newly update the address information in the address translation cache 215 so that the cache miss does not occur.

At this time, the address translation cache prefetch trigger 212 may update the address information in the address translation cache 215 to prevent an occurrence of a cache miss.

For example, when it is determined in the host 100 that the first address information (Address Info #1) does not exist in the host memory 120, in relation to the address translation service request (ATS Req) including the first address information (Address Info #1) received from the host interface 210, the host 100 sends a cache miss, which notifies that the first address information (Address Info #1) does not exist, to the host interface 210.

The host interface 210, which has received the cache miss from the host 100, updates the address information in the address translation cache 215 to the second address information (Address Info #2) through the address translation cache prefetch trigger 212. Subsequently, the host interface 210 may resend the address translation service request (ATS Req) of the second address information (address information #2) updated in the address translation cache 215 to the host 100.

That is, in some embodiments, the frequency of occurrence of a cache miss may be reduced, by continuously updating the address translation cache 215 through the address translation cache prefetch trigger 212. As the frequency of occurrence of a cache miss is reduced, for the size of a region utilized in preparation for an occurrence of a cache miss may be reduced in the address translation cache 215. Therefore, by not making the address translation cache 215 have too large of a capacity, the utilization of the limited capacity of the host interface 210 may be further enhanced. Alternatively, by reducing the region utilized in preparation for the occurrence of a cache miss with respect to the limited capacity of the address translation cache 215, because capacity in which the address translation cache 215 may be used to other usages increases, the operating efficiency of the storage device 200 may be enhanced.

The address translation cache prefetch trigger 212 according to some embodiments may periodically update the address information of the address translation cache 215, even when no cache miss has occurred.

For example, the address translation cache prefetch trigger 212 may update the address information by prefetching the address information to the address translation cache 215 so that the catch miss does not occur, at a period shorter than the time at which the storage device 200 communicates through a Direct Memory Access (DMA) protocol (e.g., the time at which the storage device 200 sends the data to the DMA).

That is, according to embodiments, it is possible to reduce an occurrence of a cache miss on the data sent and received by the host to and from the DMA.

Figure 7:
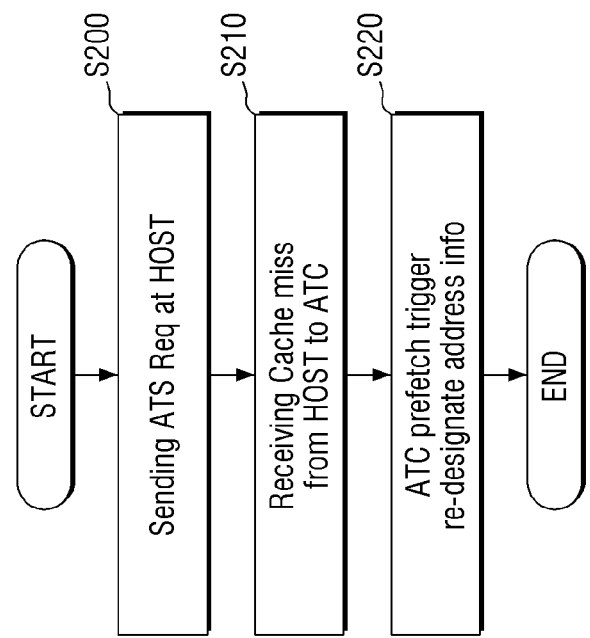
FIG. 7 is a flowchart which shows an operation of the storage device according to some embodiments.

FIG. 7 is a flowchart which shows an operation of the storage device according to some embodiments.

Referring to FIGS. 5 to 7, the host interface 210 sends the address translation service request (ATS Req) to the host 100 (S200).

Subsequently, the host interface 210 (for example, the address translation cache 215) may receive a cache miss from the host 100 (S210).

At this time, the address translation cache prefetch trigger 212 reallocates the address information inside the address translation cache 215 (S220).

Subsequently, if a cache miss does not occur, the operation of the storage system as in FIG. 4 may be performed, and if a cache miss occurs again, the operation of the storage system as in FIG. 7 may be repeated.

Figure 8:
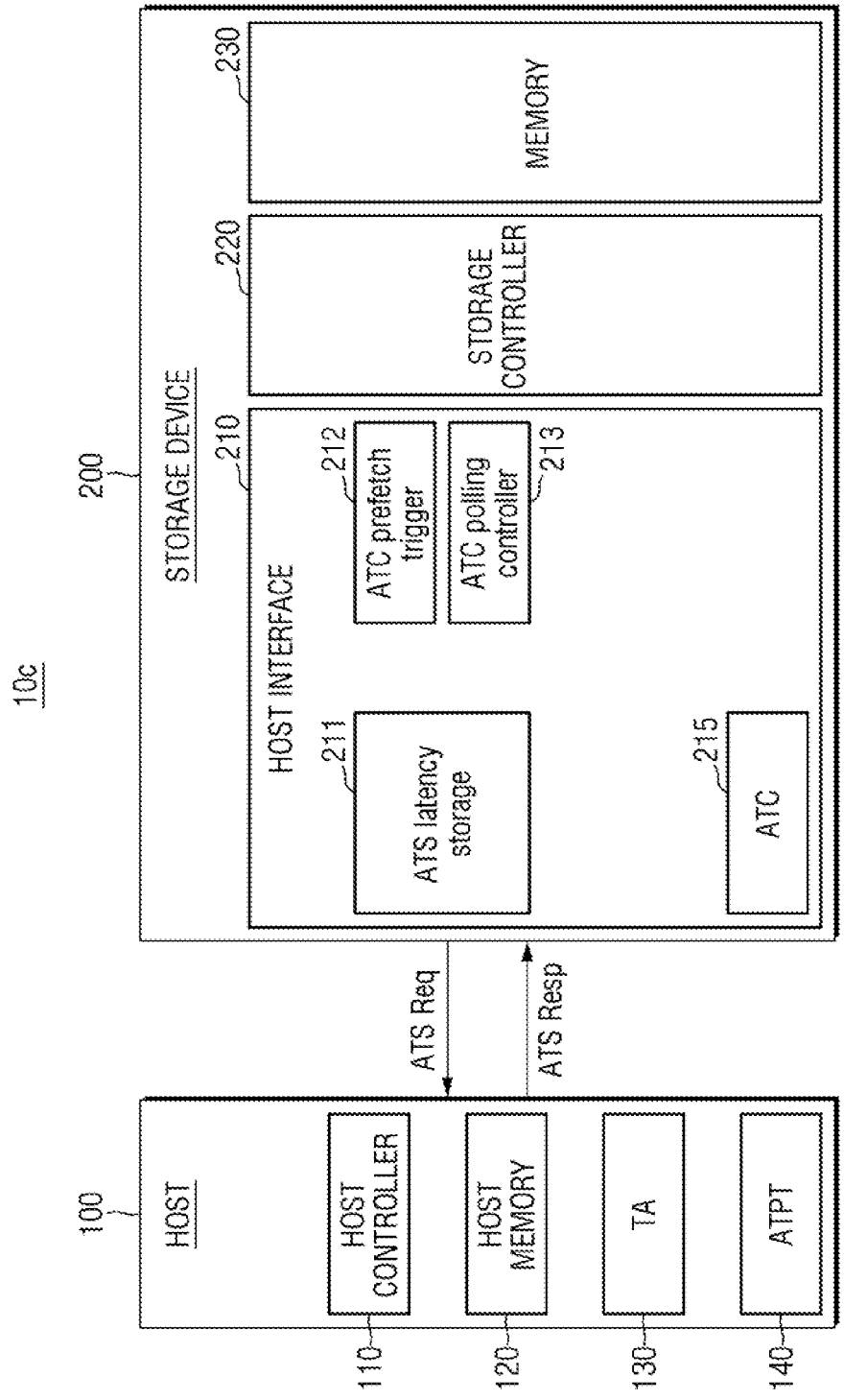
FIG. 8 is a block diagram which shows a storage system according to some embodiments.
Figure 9:
FIG. 9 is a block diagram for explaining an operation of the storage device according to some embodiments.

FIG. 8 is a block diagram which shows a storage system according to some embodiments. FIG. 9 is a block diagram for explaining an operation of the storage device according to some embodiments.

Referring to FIGS. 8 and 9, a storage system 10c according to some embodiments may further include an address translation cache polling controller 213 disposed inside the host interface 210, unlike the storage system 10b of FIG. 5.

The storage controller 220 may send and receive data to and from the host 100 through communication with the host interface 210. At this time, the storage controller 220 may periodically communicate with the host interface 210 at regular time intervals (which may be generally called a polling operation).

However, when the storage controller 220 stops operating during a certain operation (e.g., reading data from the non-volatile memory 230 or writing data to the non-volatile memory 230), and checks whether the address information required for the host interface 210 (for example, the address translation cache 215) is updated, the operating efficiency of the storage controller 220 may be reduced.

Therefore, the address translation cache polling controller 213 accurately informs the time point at which the storage controller 220 is to perform polling by referring to the latency time (T_latency) stored in the address translation service latency storage 211, and may help the storage controller 220 to perform polling at the timing when the address translation cache 215 is updated.

That is, because the address translation cache polling controller 213 controls the time required for the storage controller 220 to poll for checking the update of the address information in the address translation cache 215, the operating efficiency of the storage controller 220 can be increased.

At this time, the address translation cache polling controller 213 may control the polling time of the storage controller 220 by referring to the latency time (T_latency) stored in the address translation service latency storage 211.

Figure 10:
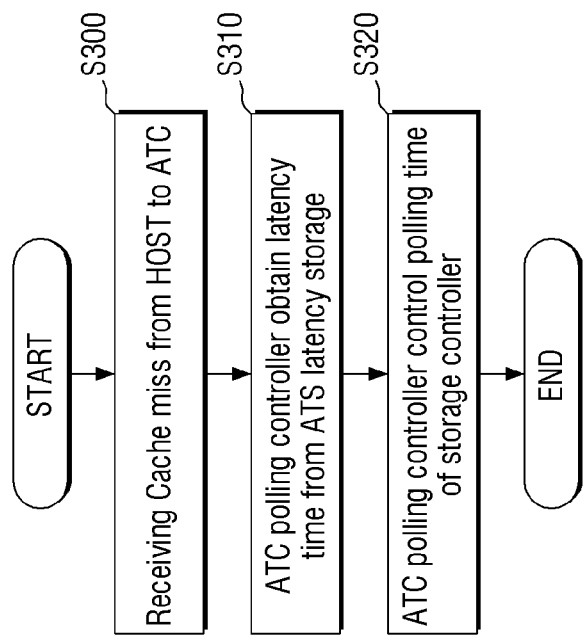
FIG. 10 is a flowchart which shows an operation of the storage device according to some embodiments.

FIG. 10 is a flowchart which shows an operation of the storage device according to some embodiments.

A case where a cache miss occurs will be described as an example referring to FIGS. 8 to 10.

The address translation cache 215 receives a cache miss from the host 100 (S300).

Subsequently, the address translation cache polling controller 213 acquires the latency time (T_latency) from the address translation service latency storage 211 (S310).

Subsequently, the address translation cache polling controller controls the polling time of the storage controller 220 in accordance with the latency time (T_latency) (S320).

Figure 11:
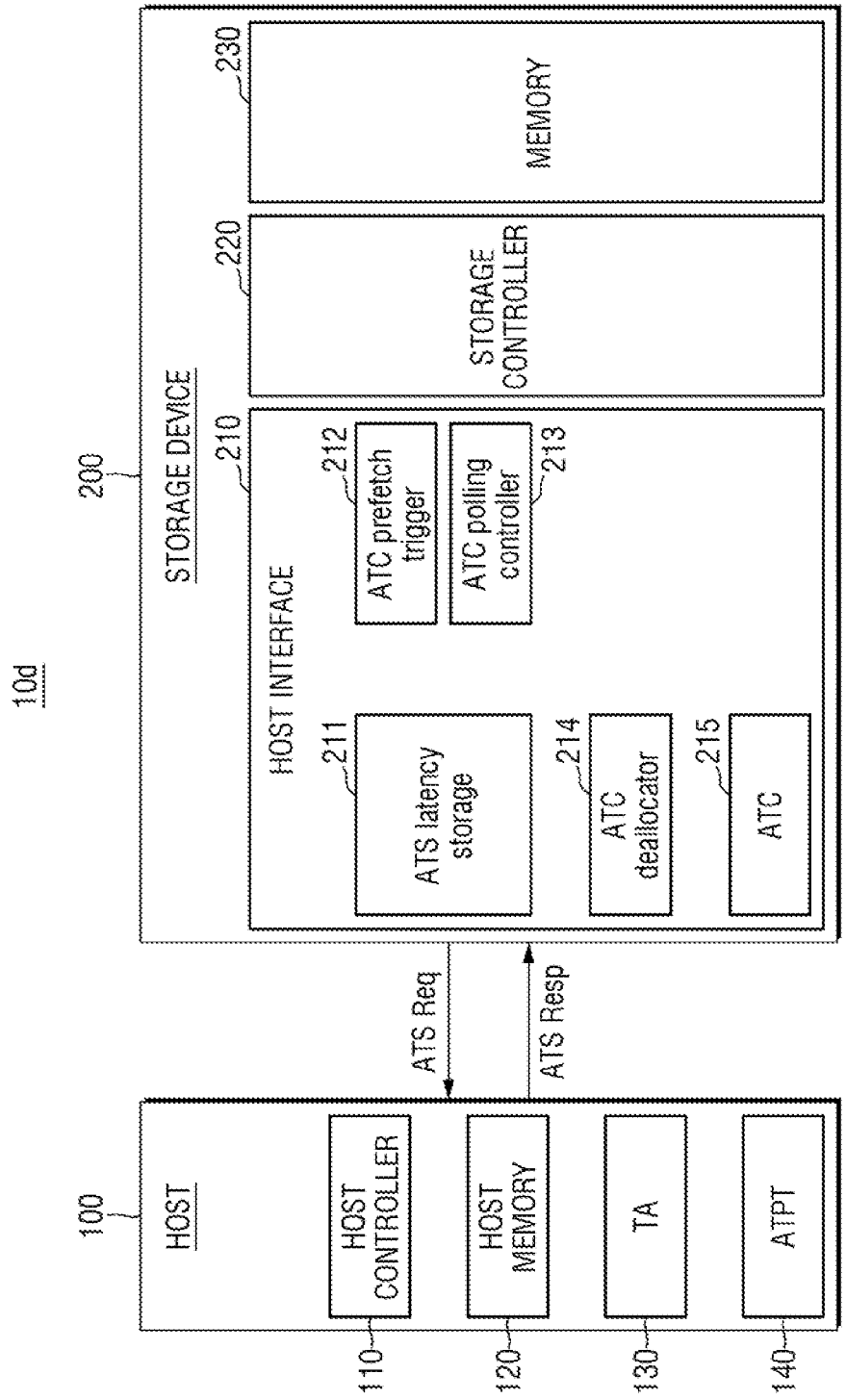
FIG. 11 is a block diagram which shows a storage system according to some embodiments.

FIG. 11 is a block diagram which shows a storage system according to some embodiments.

Referring to FIG. 11, a storage system 10c according to some embodiments further includes an address translation cache deallocator 214 disposed inside the host interface 210.

The address translation cache deallocator 214 may reallocate other information (e.g., address information) not related to the address translation service request (ATS Req) so as to be stored in the address translation cache 215, with respect to another portion other than the region prepared for the occurrence of a cache miss.

Figure 12:
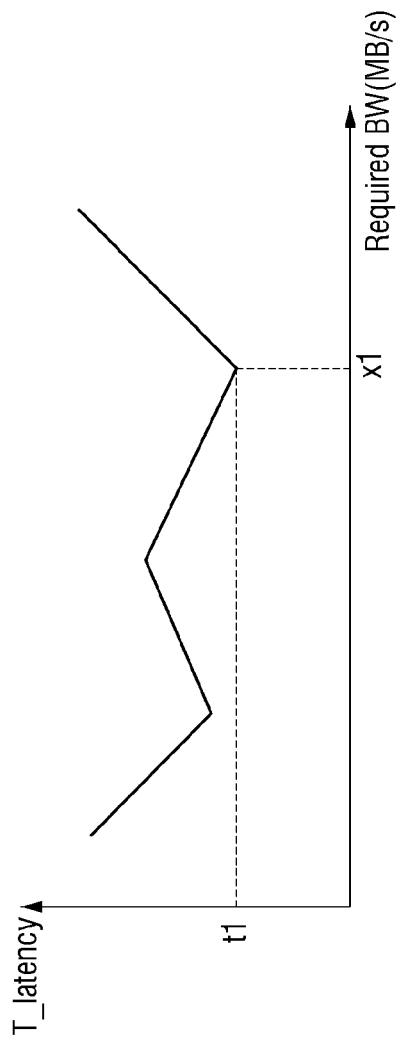
FIG. 12 is an exemplary graph which shows the latency time according to the operation performance of a storage device according to some embodiments.

FIG. 12 is an exemplary graph which shows the latency time according to the operation performance of a storage device according to some embodiments.

FIG. 12 will be described, for example, with reference to the system 10d of FIG. 11. However, embodiments of the present disclosure are not limited thereto. For example, the description of FIG. 12 may also be applicable to the storage system 10a of FIG. 1, the storage system 10b of FIG. 5, and the storage system 10c of FIG. 8.

Referring to FIGS. 11 and 12, the address translation service latency storage 211 may store a plurality of latency times (T_latency).

At this time, the plurality of latency times may be the latency times according to the bandwidth required for the host interface 210 to communicate with the host 100.

For example, referring to the graph of FIG. 12, it is assumed that the x-axis is a bandwidth required for the host interface 210 to communicate with the host 100, and the y-axis is a latency time in the communication process corresponding to each bandwidth.

The x-axis is not limited to representing bandwidth as shown in FIG. 12, and may correspond to another performance metric of the storage device 200 according to some embodiments.

Referring to FIGS. 11 and 12, a plurality of latency times according to the bandwidth required for the host interface 210 to communicate with the host 100 may be stored in the address translation service latency storage 211. The plurality of latency times according to the size of the command CMD required for the host interface 210 to communicate with the host 100 may also be stored in the address translation service latency storage 211, without being limited thereto. The plurality of latency times according to a Queue Depth (QD) required for the host interface 210 to communicate with the host 100 may also be stored in the address translation service latency storage 211, without being limited thereto.

At this time, for example, the address translation cache prefetch trigger 212 described with reference to FIGS. 5 and 6 may update the address information, by periodically prefetching the address information to the address translation cache 215 every first time t1, which is the minimum latency time among the plurality of latency times.

Figure 13:
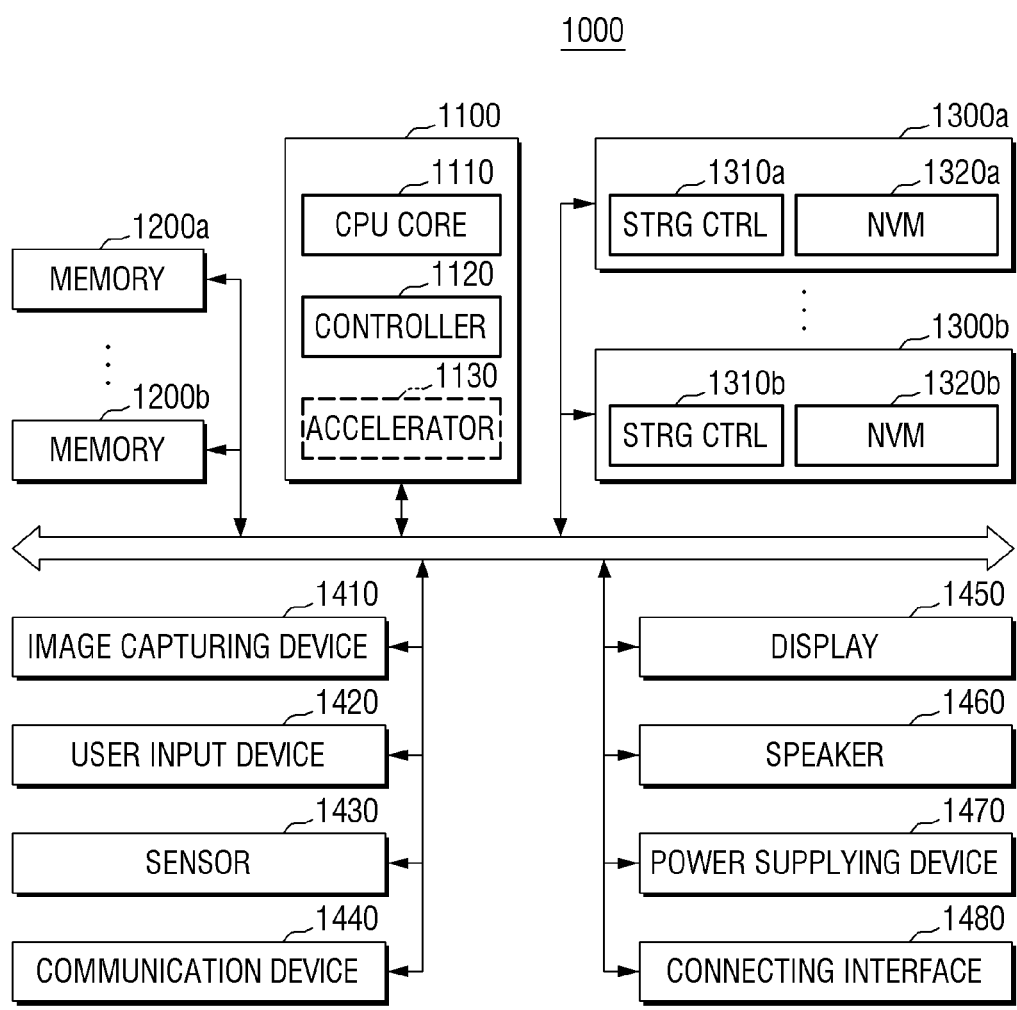
FIG. 13 is an exemplary block diagram showing a storage system to which a storage device according to some embodiments is applied.

FIG. 13 is an exemplary block diagram showing a storage system to which a storage device according to some embodiments is applied.

FIG. 13 is a diagram showing a system 1000 to which the storage device according to an embodiment of the present invention is applied. The system 1000 of FIG. 13 may be a mobile system such as, for example, a mobile phone, a smartphone, a tablet personal computer (PC), a wearable device, a healthcare device or an Internet of Things (IoT) device. However, the system 1000 of FIG. 13 is not necessarily limited to a mobile system, and may also be, for example, a personal computer, a laptop computer, a server, a media player or an automotive device such as a navigation device.

Referring to FIG. 13, the system 1000 may include a main processor 1100, memories 1200a and 1200b, and storage devices 1300a and 1300b, and may further include one or more of an image capturing device 1410, a user input device 1420, a sensor 1430, a communication device 1440, a display 1450, a speaker 1460, a power supplying device 1470, and a connecting interface 1480.

In some embodiments, the storage devices 1300a and 1300b may include the host interface described above with reference to FIGS. 1 to 11.

The main processor 1100 may control the overall operation of the system 1000, for example, the operation of other components that form the system 1000. Such a main processor 1100 may be implemented as, for example, a general-purpose processor, a dedicated processor, an application processor, etc.

The main processor 1100 may include one or more CPU cores 1110, and may further include a controller 1120 for controlling the memories 1200a and 1200b and/or the storage devices 1300a and 1300b. According to embodiments, the main processor 1100 may further include an accelerator 1130, which is a dedicated circuit for high speed data computation such as artificial intelligence (AI) data computation. Such an accelerator 1130 may include, for example, a Graphics Processing Unit (GPU, a Neural Processing Unit (NPU), and/or a Data Processing Unit (DPU), and may also be implemented as a separate chip that is physically independent of other components of the main processor 1100.

The memories 1200a and 1200b may be used as main memory units of the system 1000, and may include a volatile memory such as, for example, a SRAM and/or a DRAM, but may also include a non-volatile memory such as, for example, a flash memory, a PRAM, a MRAM and/or a RRAM. The memories 1200a and 1200b may also be implemented inside the same package as the main processor 1100.

The storage devices 1300a and 1300b may function as non-volatile storage devices for storing data regardless of the presence or absence of the supply of power source, and may have a relatively large storage capacity as compared with the memories 1200a and 1200b. The storage devices 1300a and 1300b may include storage controllers 1310a and 1310b and non-volatile memories (NVM) 1320a and 1320b for storing the data under the control of the storage controllers 1310a and 1310b. The non-volatile memories 1320a and

1320b may include flash memory of a 2D (two-dimensional) structure or a 3D (three-dimensional) Vertical NAND (VNAND) structure, but may also include other types of non-volatile memory such as a PRAM and/or a RRAM.

The storage devices 1300a and 1300b may be included in the system 1000 in the state of being physically separated from the main processor 1100, or may be implemented inside the same package as the main processor 1100. Further, the storage devices 1300a and 1300b have a form such as a solid state device (SSD) or a memory card, and thus may be detachably combined with other components of the system 1000 through an interface such as a connecting interface 1480, to be described below. Such storage devices 1300a and 1300b may be devices to which standard protocols such as, for example, a Universal Flash Storage (UFS), an embedded multi-media card (eMMC) or a non-volatile memory express (NVMe) are applied, but are not necessarily limited thereto.

The image capturing device 1410 may capture a still image or a moving image, and may be, for example, a camera, a camcorder, and/or a webcam.

The user input device 1420 may receive various types of data that are input from the user of the system 1000, and may be, for example, a touch pad, a keypad, a keyboard, a mouse, a microphone etc.

The sensor 1430 may sense various types of physical quantities that may be acquired from outside of the system 1000 and convert the sensed physical quantities into electrical signals. Such a sensor 1430 may be, for example, a temperature sensor, a pressure sensor, an illuminance sensor, a position sensor, an acceleration sensor, a biosensor and/or a gyroscope sensor, etc.

The communication device 1440 may transmit and receive signals to and from other devices outside the system 1000 according to various communication protocols. Such a communication device 1440 may be implemented to include, for example, an antenna, a transceiver, and/or a modem etc.

The display 1450 and the speaker 1460 may function as output devices that output visual and auditory information to the users of the system 1000, respectively.

The power supplying device 1470 may appropriately convert the power supplied from a battery equipped in the system 1000 and/or an external power source, and supply the power to each constituent element of the system 1000.

The connecting interface 1480 may provide a connection between the system 1000 and an external device that may be connected to the system 1000 to send and receive data to and from the system 1000. The connecting interface 1480 may be implemented in various interface types, such as, for example, an Advanced Technology Attachment), a Serial ATA (SATA), an external SATA (e-SATA), a Small Computer Small Interface (SCSI), a Serial Attached SCSI (SAS), a Peripheral Component Interconnection (PCI), a PCI Express (PCIe), a NVMe, an IEEE 1394, a universal serial bus (USB), a secure digital (SD) card, a multi-media card (MMC), an eMMC, a UFS, an embedded Universal Flash Storage (eUFS), and a compact flash (CF) card interface.

Figure 14:
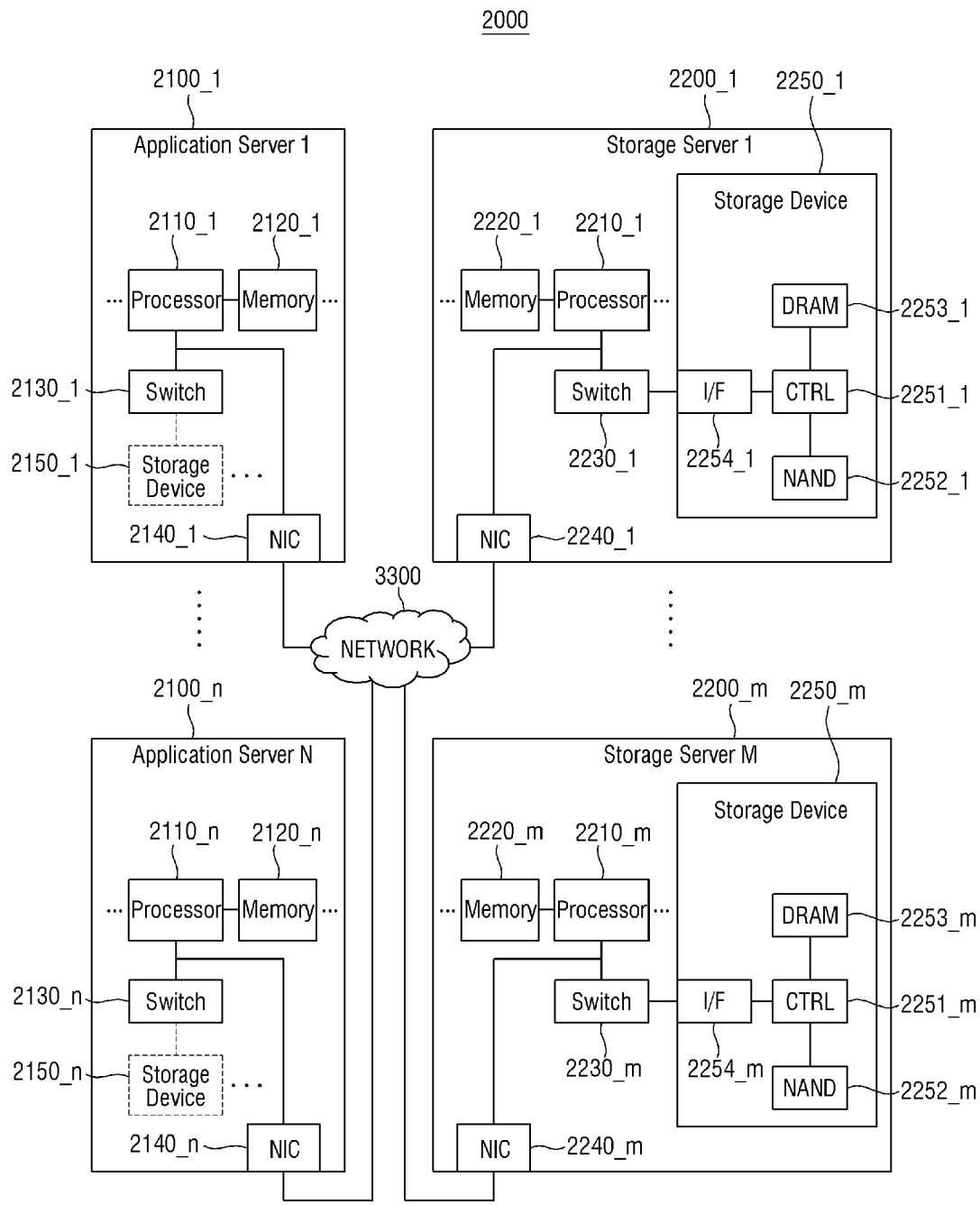
FIG. 14 is an exemplary block diagram for explaining a data center to which the storage device according to some embodiments is applied.

FIG. 14 is an exemplary block diagram for explaining a data center to which the storage device according to some embodiments is applied.

Referring to FIG. 14, a data center 2000 is a facility that gathers various types of data and provides services, and may also be called a data storage center. The data center 2000 may be a system for search engine and database operation, and may be a computing system used by corporations such as banks or government agencies. The data center 2000 may include application servers 2100_1 to 2100_n and storage servers 2200_1 to 2200_m, in which n and m are positive integers. The number of application servers 2100_1 to 2100_n and the number of storage servers 2200_1 to 2200_m may be variously selected, and the number of application servers 2100_1 to 2100_n and the number of storage servers 2200_1 to 2200_m may be different from each other in some embodiments.

The application server 2100 or the storage server 2200 may include at least one of the processors 2110 and 2210 and the memories 2120 and 2220. Taking the storage server 2200 as an example, the processor 2210 may control the overall operation of the storage server 2200, and access the memory 2220 to execute command and/or data loaded into the memory 2220. The memory 2220 may be, for example, a Double Data Rate Synchronous DRAM (DDR SDRAM), a High Bandwidth Memory (HBM), a Hybrid Memory Cube (HMC), a Dual In-line Memory Module (DIMM), an Optane DIMM and/or a Non-Volatile DIMM (NVMDIMM). According to embodiments, the number of processors 2210 and the number of memories 2220 included in the storage server 2200 may be variously selected. In an embodiment, the processor 2210 and the memory 2220 may provide a processor-memory pair. In an embodiment, the number of processors 2210 and the number of memories 2220 may be different from each other. The processor 2210 may include a single core processor or a multi-core processor. The aforementioned explanation of the storage server 2200 may also be similarly applied to the application server 2100. According to embodiments, the application server 2100 may not include a storage device 2150. The storage server 2200 may include at least one or more storage devices 2250. The number of storage devices 2250 included in the storage server 2200 may be variously selected.

In some embodiments, the storage device 2250 may include the host interface described above with reference to FIGS. 1 to 11.

The application servers 2100_1 to 2100_n and the storage servers 2200_1 to 2200_m may communicate with each other through a network 3300. The network 3300 may be implemented using, for example, a Fibre Channel (FC), an Ethernet connection, etc. FC is a medium used for relatively high-speed data transmission, and may use an optical switch that provides high performance/high availability. Depending on the access type of the network 3300, the storage servers 2200_1 to 2200_m may be provided as, for example, a file storage, a block storage or an object storage.

In an embodiment, the network 3300 may be a storage-only network such as a storage area network (SAN). For example, the SAN may be an FC-SAN that uses an FC network and is implemented according to FC Protocol (FCP). In an embodiment, a SAN may be an IP-SAN that uses a TCP/IP network and is implemented according to the SCSI over TCP/IP or Internet SCSI (iSCSI) protocol. In an example, the network 3300 may be a general network such as a TCP/IP network. For example, the network 3300 may be implemented according to protocols such as, for example, an FC over Ethernet (FCoE), a Network Attached Storage (NAS), and an NVMe over Fabrics (NVMe-oF).

Hereinafter, the application server 2100 and the storage server 2200 will be primarily described. The description of the application server 2100 may also be applied to another application server 2100_n, and the description of the storage server 2200 may also be applied to another storage server 2200_m.

The application server 2100 may store the data requested to store by a user or client in one of the storage servers 2200_1 to 2200_m through the network 3300. Further, the application server 2100 may acquire the data requested to read by the user or client from one of the storage servers 2200_1 to 2200_m through the network 3300. For example, the application server 2100 may be implemented as a Web server, a Database Management System (DBMS) etc.

The application server 2100 may access a memory 2120_n or a storage device 2150_n included in another application server 2100_n through the network 3300, or may access memories 2220_1 to 2220_m or storage devices 2250_1 to 2250_m included in the storage servers 2200_1 to 2200_m through the network 3300. Accordingly, the application server 2100 may perform various operations on the data stored in the application servers 2100_1 to 2100_n and/or the storage servers 2200_1 to 2200_m. For example, the application server 2100 may execute commands for moving or copying the data between the application servers 2100_1 to 2100_n and/or the storage servers 2200_1 to 2200_m. At this time, the data may be moved from the storage devices 2250_1 to 2250_m of the storage servers 2200_1 to 2200_m via the memories 2220_1 to 2220_m of the storage servers 2200_1 to 2200_m, or may be directly moved to the memories 2120_1 to 2120_n of the application servers 2100_1 to 2100_n. Data which moves through the network 3300 may be data encrypted for security or privacy.

Taking the storage server 2200 as an example, an interface 2254 may provide a physical connection between the processor 2210 and a controller 2251, and a physical connection between the Network InterConnect (NIC) 2240 and the controller 2251. For example, the interface 2254 may be implemented in a Direct Attached Storage (DAS) type in which the storage device 2250 is directly connected with a dedicated cable. Further, for example, the interface 2254 may be implemented in various interface types, such as an Advanced Technology Attachment (ATA), a Serial ATA (SATA), an external SATA (e-SATA), a Small Computer Small Interface (SCSI), a Serial Attached SCSI (SAS), a Peripheral Component Interconnection (PCI), a PCI Express (PCIe), a NVM Express (NVMe), an IEEE 1394, a universal serial bus (USB), a secure digital (SD) card, a multi-media card (MMC), an embedded multi-media card (eMMC), a Universal Flash Storage (UFS), an embedded Universal Flash Storage (eUFS), and/or a compact flash (CF) card interface.

The storage server 2200 may further include a switch 2230 and a NIC 2240. The switch 2230 may selectively connect the processor 2210 and the storage device 2250 or may selectively connect the NIC 2240 and the storage device 2250, according to the control of the processor 2210.

In an embodiment, the NIC 2240 may include, for example, a network interface card, a network adapter, etc. The NIC 2240 may be connected to the network 3300 by, for example, a wired interface, a wireless interface, a Bluetooth® interface, an optical interface, etc. The NIC 2240 may include an internal memory, a Digital Signal Processor (DSP), a host bus interface, etc., and may be connected to the processor 2210 and/or the switch 2230, etc. through the host bus interface. The host bus interface may also be implemented as one of the examples of the interface 2254 described above. In an embodiment, the NIC 2240 may be integrated with at least one of the processor 2210, the switch 2230, and the storage device 2250.

In the storage servers 2200_1 to 2200_m or the application servers 2100_1 to 2100_n, the processor may send the commands to the storage devices 2150_1 to 2150_n and 2250_1 to 2250_m or the memories 2120_1 to 2120_n and 2220_1 to 2220_m to program or read the data. At this time, the data may be data in which an error is corrected through an Error Correction Code (ECC) engine. The data is data subjected to data bus inversion (DBI) or data masking (DM) process, and may include Cyclic Redundancy Code (CRC) information. The data may be data that is encrypted for security or privacy.

The storage devices 2150_1 to 2150_n and 2250_1 to 2250_m may send the control signal and command/address signal to the NAND flash memory devices 2252 to 2252m in response to the read command received from the processor. Accordingly, when data is read from the NAND flash memory devices 2252 to 2252m, the Read Enable (RE) signal is input as a data output control signal, and may serve to output the data to the DQ bus. A Data Strobe (DQS) may be generated using the RE signal. Commands and address signals may be latched to the page buffer depending on a rising edge or a falling edge of a Write Enable (WE) signal.

The controller 2251 may generally control the operation of the storage device 2250. In an embodiment, the controller 2251 may include a Static Random Access Memory (SRAM). The controller 2251 may write data in a NAND flash 2252 in response to a write command, or may read the data from the NAND flash 2252 in response to a read command. For example, the write command and/or the read command may be provided from the processor 2210 in the storage server 2200, a processor 2210_m in another storage server 2200_m or the processors 2110 and 2110_n in the application servers 2100 and 2100_n. A DRAM 2253 may temporarily store (buffer) the data to be written in the NAND flash 2252 or the data read from the NAND flash 2252. Also, the DRAM 2253 may store metadata. Here, the metadata is a user data or data generated by the controller 2251 to manage the NAND flash 2252. The storage device 2250 may include a Secure Element (SE) for security or privacy.

As is traditional in the field of the present invention, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

In an embodiment of the present invention, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In an embodiment of the present invention, the 3D memory array includes vertical NAND strings that are vertically oriented such that at least one memory cell is located over another memory cell. The at least one memory cell may include a charge trap layer. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

While the present invention has been particularly shown and described with reference to embodiments thereof, it will be understood by those of ordinary skill in the art that various changes in form and detail may be made therein without departing from the spirit and scope of the present invention as defined by the following claims.

What is claimed is:

1. A storage device, comprising:
    a storage controller; and
    a host interface which sends an address translation service request to a host,
    wherein the host interface comprises:
    an address translation cache which stores first address information included in the address translation service request; and
    an address translation service latency storage which stores latency-related information including a first time until the address translation cache receives an address translation service response corresponding to the address translation service request from the host,
    wherein, after the host interface sends the address translation service request to the host based on the latency-related information including the first time, and after the first time elapses, the storage controller polls the host interface.

2. The storage device of claim 1, wherein the address translation service request comprises second address information, and requests a first address mapped to the second address information, and
    the host interface further comprises an address translation cache prepatch trigger which changes the first address information included in the address translation service request to third address information after the address translation service request is sent, and prefetches the third address information to the address translation cache.

3. The storage device of claim 1, wherein the first time is shorter than a time at which the storage controller communicates through a direct memory access (DMA) protocol.

4. The storage device of claim 1, wherein the host interface further comprises:
    an address translation cache polling controller which controls the storage controller to poll the host interface after a time obtained by averaging the first time, by referring to the first time stored in the address translation service latency storage.

5. The storage device of claim 4, wherein the address translation cache polling controller controls the storage controller to poll the address translation cache every first time, when the host interface receives a cache miss from the host.

6. The storage device of claim 1, wherein the storage controller polls the host interface at a period of a minimum time among the first time.

7. The storage device of claim 1, wherein the host interface further comprises:
    an address translation cache deallocator,
    wherein the address translation cache deallocator allocates some regions in the address translation cache to store information that is not related to the address translation service request.

8. A storage system, comprising:
    a host; and
    a storage device comprising a host interface that sends an address translation service request to the host, and a storage controller that polls the host interface,
    wherein the host interface comprises:
    an address translation cache which stores first address information included in the address translation service request; and
    an address translation service latency storage which stores latency-related information including a latency time until the address translation cache receives an address translation service response corresponding to the address translation service request from the host,
    wherein, after the host interface sends the address translation service request to the host based on the latency-related information including the latency time, and after the latency time elapses, the storage controller polls the host interface.

9. The storage system of claim 8, wherein the address translation service request comprises second address information, and requests a first address mapped to the second address information, and
    the host interface further comprises an address translation cache prepatch trigger which changes the first address information included in the address translation service request to third address information after the address translation service request is sent, and prefetches the third address information to the address translation cache.

10. The storage system of claim 8, wherein the latency time is shorter than a time at which the storage controller communicates through a direct memory access (DMA) protocol.

11. The storage system of claim 8, wherein the host interface further comprises:
    an address translation cache polling controller which controls the storage controller to poll the host interface after a time obtained by averaging the latency time, by referring to the latency time stored in the address translation service latency storage.

12. The storage system of claim 11, wherein the address translation cache polling controller controls the storage controller to poll the address translation cache every first time, when the host interface receives a cache miss from the host.

13. The storage system of claim 8, wherein the storage controller polls the host interface at a period of a minimum time among the latency time.

14. The storage system of claim 8, wherein the host interface further comprises:
    an address translation cache deallocator,
    wherein the address translation cache deallocator allocates some regions in the address translation cache to store information that is not related to the address translation service request.

15. A method of operating a storage device, the method comprising:
    sending an address translation service request to a host through a host interface;
    receiving an address translation service response from the host, by an address translation cache which stores first address information to be sent to the host;

measuring a first time at which the address translation service response is sent to the address translation cache from the host; and recording the first time in an address translation service latency storage, wherein, after the host interface sends the address translation service request to the host based on the recorded first time, and after the first time elapses, a storage controller communicating with the host interface polls the host interface.

16. The method of operating the storage device of claim 15, wherein the address translation service request comprises second address information, and requests a first address mapped to the second address information, the first address information included in the address translation service request is changed to third address information through an address translation cache prefetch trigger after the address translation service request is sent, and the third address information is prefetched to the address translation cache through the address translation cache prefetch trigger.

17. The method of operating the storage device of claim 15, wherein the first time is shorter than a time at which the storage controller communicates through a direct memory access (DMA) protocol.

18. The method of operating the storage device of claim 15, further comprising:

controlling the storage controller to poll the host interface after a time obtained by averaging the first time, by referring to the first time recorded in the address translation service latency storage through an address translation cache polling controller.

19. The method of operating the storage device of claim 18 wherein the address translation cache polling controller controls the storage controller to poll the address translation cache every first time, when the host interface receives a cache miss from the host.

20. The method of operating the storage device of claim 15, wherein the storage controller polls the host interface at a period of a minimum time among the first time.

* * * * *